US012682123B2

(12) United States Patent    (10) Patent No.:   US 12,682,123 B2
Ouni et al.                    (45) Date of Patent:      Jul. 14, 2026

(54) LINE ENCRYPTION OVER ETHERNET CABLE

(71) Applicant: Technology Innovation Institute—Sole Proprietorship LLC, Masdar City (AE)

(72) Inventors: Bassem Ouni, Abu Dhabi (AE); David Naccache, Paris (FR)

(73) Assignee: Technology Innovation Institute—Sole Proprietorship LLC, Masdar City (AE)

( * ) Notice: Subject to any disclaimer, the term of this patent is extended or adjusted under 35 U.S.C. 154(b) by 295 days.

(21) Appl. No.: 18/154,404

(22) Filed: Jan. 13, 2023

(65) Prior Publication Data

US 2024/0241993 A1     Jul. 18, 2024

(51) Int. Cl.
    *G06F 21/72*       (2013.01)
    *G06F 21/60*       (2013.01)
    *G06F 21/85*       (2013.01)

(52) U.S. Cl.
    CPC ............ *G06F 21/72* (2013.01); *G06F 21/602* (2013.01); *G06F 21/85* (2013.01)

(58) Field of Classification Search
    CPC ......... G06F 21/72; G06F 21/602; G06F 21/85
(Continued)

(56) References Cited

U.S. PATENT DOCUMENTS

| | | | |
|---|---|---|---|
| 7,094,110 B1 * | 8/2006 | Shelton | ................. H04L 12/413 |
| | | | 379/93.05 |
| 8,533,494 B2 * | 9/2013 | Harada | ................. G06F 21/602 |
| | | | 713/193 |

(Continued)

FOREIGN PATENT DOCUMENTS

| | | | |
|---|---|---|---|
| CN | 1747370 A | * | 3/2006 |
| CN | 203180248 | | 9/2013 |

(Continued)

OTHER PUBLICATIONS

Zhang, Peng, Omar Elkeelany, and Layton Mcdaniel. "An implementation of secured Smart Grid Ethernet communications using AES." In Proceedings of the IEEE SoutheastCon 2010 (SoutheastCon), pp. 394-397. IEEE, 2010. (Year: 2010).*

(Continued)

*Primary Examiner* — Luu T Pham
*Assistant Examiner* — Walter J Malinowski
(74) *Attorney, Agent, or Firm* — DLA Piper LLP

(57)            ABSTRACT

A cable having a first connector electrically coupled to the first end of the cable, where the first connector includes a first energy storage device and a first cryptography processor, and a second connector electrically coupled to the second end of the cable. The second connector includes a second energy storage device and a second cryptography processor. The first energy storage device is configured to power the first cryptography processor for encrypting transmission data transmitted through the first connector over the cable to the second connector, and for decrypting reception data received by the first connector over the cable from the second connector. The second energy storage device is configured to power the second cryptography processor for encrypting transmission data transmitted through the second connector over the cable to the first connector, and for decrypting reception data received by the second connector over the cable from the first connector.

12 Claims, 12 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 2002/0138442 A1* | 9/2002 | Hori | | G06F 21/10 |
| | | | | 705/51 |
| 2003/0159062 A1* | 8/2003 | Tozawa | | H04N 5/913 |
| 2005/0239439 A1* | 10/2005 | Manabe | | H04L 63/061 |
| | | | | 455/410 |
| 2006/0291648 A1* | 12/2006 | Sasaki | | H04L 9/065 |
| | | | | 380/37 |
| 2007/0011626 A1* | 1/2007 | Castaneda | | G06F 9/451 |
| | | | | 700/295 |
| 2007/0049120 A1* | 3/2007 | Hemmah | | H01R 13/665 |
| | | | | 439/620.01 |
| 2008/0107275 A1* | 5/2008 | Asnaashari | | G06F 21/80 |
| | | | | 380/281 |
| 2009/0169003 A1* | 7/2009 | Sung | | H04N 21/4408 |
| | | | | 380/279 |
| 2009/0316892 A1* | 12/2009 | Candelore | | H04N 21/4408 |
| | | | | 380/210 |
| 2010/0169671 A1* | 7/2010 | Coussieu | | G06F 21/75 |
| | | | | 713/193 |
| 2012/0164870 A1* | 6/2012 | Murphy | | H01R 13/59 |
| | | | | 439/449 |
| 2012/0217292 A1* | 8/2012 | Gratton | | H04N 21/4722 |
| | | | | 235/375 |
| 2014/0089547 A1* | 3/2014 | Fyke | | H04W 4/18 |
| | | | | 370/328 |
| 2014/0091807 A1* | 4/2014 | Lontka | | G01R 31/52 |
| | | | | 324/509 |
| 2014/0258742 A1* | 9/2014 | Chien | | H04L 12/10 |
| | | | | 713/300 |
| 2014/0321261 A1* | 10/2014 | Lee | | H04L 41/0654 |
| | | | | 370/216 |
| 2014/0335732 A1* | 11/2014 | Oberski | | H01R 13/02 |
| | | | | 439/626 |
| 2015/0089222 A1* | 3/2015 | White | | H04W 12/04 |
| | | | | 713/168 |
| 2015/0310232 A1* | 10/2015 | Biggs | | G06F 21/85 |
| | | | | 726/34 |
| 2015/0347744 A1* | 12/2015 | Kennedy | | G06F 21/44 |
| | | | | 600/467 |
| 2016/0064938 A1* | 3/2016 | Balasubramanian | ... | H04L 12/10 |
| | | | | 307/11 |
| 2016/0269371 A1* | 9/2016 | Coimbatore | | H04L 63/20 |
| 2017/0272248 A1* | 9/2017 | Ozzie | | G06F 3/067 |
| 2018/0019554 A1* | 1/2018 | Yang | | H01R 13/504 |
| 2018/0150094 A1 | 5/2018 | Conroy et al. | | |
| 2018/0365069 A1* | 12/2018 | Nemiroff | | H04L 9/0822 |
| 2019/0235803 A1* | 8/2019 | Wong | | G06F 3/1221 |
| 2021/0152531 A1* | 5/2021 | Pan | | H04W 4/44 |
| 2021/0185095 A1* | 6/2021 | Harel | | H04L 9/0894 |
| 2021/0305680 A1* | 9/2021 | Amor | | G01S 19/43 |
| 2022/0048448 A1* | 2/2022 | Kraemer | | H01R 13/6592 |
| 2022/0183135 A1* | 6/2022 | Friedemann | | H05G 1/10 |
| 2023/0115600 A1* | 4/2023 | Stollwerck | | H01B 17/56 |
| | | | | 324/126 |
| 2023/0308423 A1* | 9/2023 | Maraveyas | | G06F 1/1698 |
| 2024/0154332 A1* | 5/2024 | Yang | | H01R 12/73 |

FOREIGN PATENT DOCUMENTS

| | | | | | |
|---|---|---|---|---|---|
| CN | 203180248 U | * | 9/2013 | | |
| CN | 206506120 | | 9/2017 | | |
| CN | 206961130 | | 2/2018 | | |
| CN | 107978885 B | * | 10/2019 | ........ | H01R 13/6467 |
| CN | 111641510 A | * | 9/2020 | .......... | H01R 13/629 |
| EP | 1995845 | | 11/2008 | | |
| KR | 19990023539 A | * | 3/1999 | ....... | H04B 10/25891 |
| TW | M245606 U | * | 10/2004 | | |

OTHER PUBLICATIONS

Potlapally, Nachiketh R., Srivaths Ravi, Anand Raghunathan, and Niraj K. Jha. "A study of the energy consumption characteristics of cryptographic algorithms and security protocols." IEEE Transactions on mobile computing 5, No. 2 (2005): 128-143. (Year: 2005).*

Braeken, "Secure remote reconfiguration of an FPGA-based embedded system." In 6th International Workshop on Reconfigurable Communication-Centric Systems-on-Chip (ReCoSoC), pp. 1-6. IEEE, 2011. (Year: 2011).*

Cherrick, Sol, Chuck Pint, Steve Sigman, Tom Zato, Ken Milnes, Molly King, Jeff Kochy, and Dave Warden. "An individually addressable TV receiver with interactive channel guide display, VCR, and cable box control." IEEE transactions on consumer electronics 40, No. 3 (1994): 317-328. (Year: 1994).*

International Search Report and Written Opinion for Application No. PCT/IB2024/050293, mailed on Mar. 27, 2024, 9 pages.

Jain, et al., "Energy Harvesting via Analog-to-Digital Conversion," 28th European Signal Processing Conference (EUSIPCO), Dec. 18, 2020, pp. 2299-2303.

Office Action and Search Report for United Arab Emirates Patent Application No. P6000087/2024, dated Nov. 29, 2025, 10 pages.

* cited by examiner

204

Unsecure
Connector
(e.g. RJ45)

200

Encoded Data Exposed To Snooping

202

Unsecure
Connector
(e.g. RJ45)

Processor
600

C2

608

Power Harvester IC
(e.g. MAX17710)

610

604

Tx+

Tx-

Rx+

Rx-

602

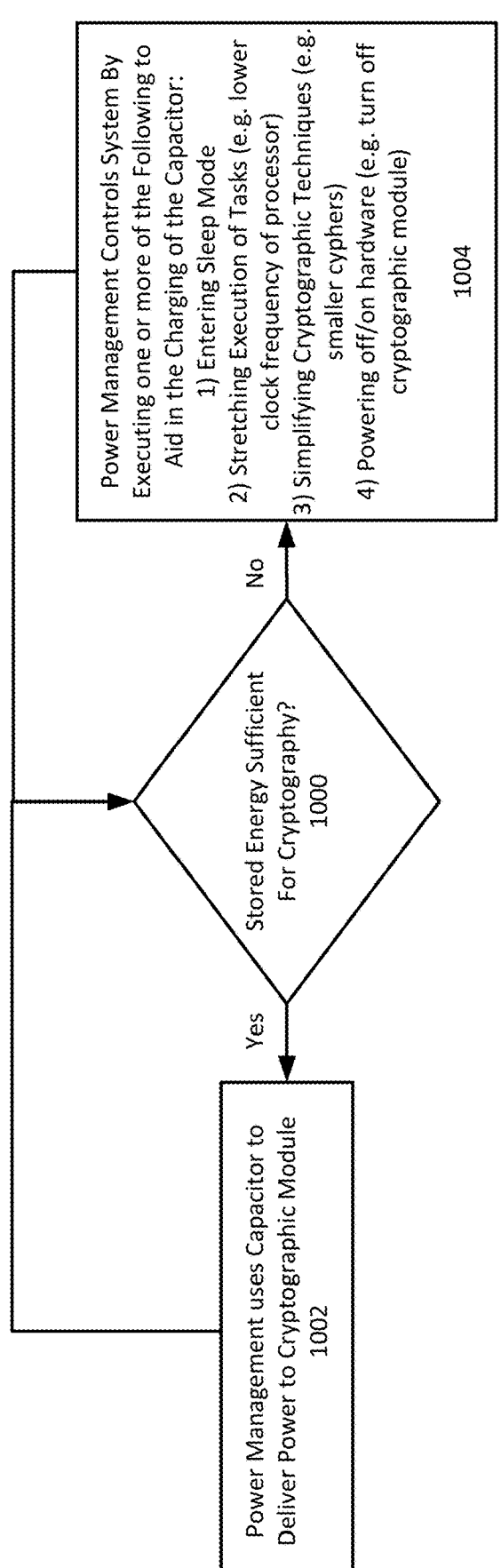

Power Management Controls System By Executing one or more of the Following to Aid in the Charging of the Capacitor:
1) Entering Sleep Mode
2) Stretching Execution of Tasks (e.g. lower clock frequency of processor)
3) Simplifying Cryptographic Techniques (e.g smaller cyphers)
4) Powering off/on hardware (e.g. turn off cryptographic module)

1004

No

Stored Energy Sufficient For Cryptography? 1000

Yes

Power Management uses Capacitor to Deliver Power to Cryptographic Module 1002

Fig. 10

LINE ENCRYPTION OVER ETHERNET CABLE

FIELD

A system and method for line encryption over Ethernet cable.

BACKGROUND

Computer-based devices such as servers, PCs and the like are commonly connected to each other using Ethernet cables. An Ethernet cable includes a twisted pair cables having connectors (e.g. RJ45) on both ends for plugging the cable into computer-based devices. Although Ethernet cables are widely used in the industry for efficient communications, they are unsecured and susceptible to eavesdropping (sniffing) attacks by an attacker. In other words, if an attacker has physical access to a portion of the Ethernet cable, an eavesdropping device may be employed without the computer-based devices (e.g. PCs, servers, etc.) being aware of such an attack.

SUMMARY

In one aspect, the present disclosure relates to a cable for securing communications. In some embodiments, the cable can include a plurality of conductors spanning a length of the cable from a first end of the cable to a second end of the cable, a first connector electrically coupled to the conductors at the first end of the cable, where the first connector includes a first energy storage device and a first cryptography processor, and a second connector electrically coupled to the conductors at the second end of the cable, where the second connector includes a second energy storage device and a second cryptography processor. In some embodiments, the first energy storage device can be configured to power the first cryptography processor for encrypting transmission data transmitted through the first connector over the cable to the second connector, and for decrypting reception data received by the first connector over the cable from the second connector. In some embodiments, the second energy storage device can be configured to power the second cryptography processor for encrypting transmission data transmitted through the second connector over the cable to the first connector, and for decrypting reception data received by the second connector over the cable from the first connector.

In some embodiments of this aspect, the first connector and the second connector of the disclosed cable can be RJ45 connectors for facilitating ethernet communications over the cable between a first computer-based device connected to the first connector and a second computer-based device connected to the second connector.

In some embodiments of this aspect, the disclosed cable according to any one of the above example embodiments can have as the first energy storage device a first capacitor, and the second energy storage device can be a second capacitor.

In some embodiments of this aspect, the disclosed cable according to any one of the above example embodiments can include a first power harvesting circuit and a second power harvesting circuit. In some embodiments, the first power harvesting circuit can be configured to harvest power from data signals transmitted through the first connector, by rectifying the data signals to produce a rectified signal, and using the rectified signal to charge the first energy storage device, or harvest power from continuously high and low voltage signals transmitted through the first connector, by using the continuously high and low voltage signals to charge the first energy storage device. In some embodiments, the second power harvesting circuit can be configured to harvest power from data signals transmitted through the second connector, by rectifying the data signals to produce a rectified signal, and using the rectified signal to charge the second energy storage device, or harvest power from continuously high and low voltage signals transmitted through the second connector, by using the continuously high and low voltage signals to charge the second energy storage device.

In some embodiments of this aspect, the disclosed cable according to any one of the above example embodiments can include a first universal serial bus (USB) connector coupled to the first connector, and a second USB connector coupled to the second connector. In some embodiments, the first USB connector can be configured to provide power for charging the first energy storage device, and the second USB connector can be configured to provide power for charging the second energy storage device.

In some embodiments of this aspect, the disclosed cable according to any one of the above example embodiments can include a first power management processor and a second power management processor. In some embodiments, the first power management processor can be configured to control at least one of the first cryptography processor or transmission of the transmission data based on a charge level of the first energy storage device, and the second power management processor can be configured to control at least one of the second cryptography processor or transmission of the transmission data based on a charge level of the second energy storage device.

In some embodiments of this aspect, according to any one of the above example embodiments, the first energy storage device and the first cryptography processor of the disclosed cable can be mounted to a first printed circuit board (PCB) inside of the first connector, and the second energy storage device and the second cryptography processor can be mounted to a second PCB inside of the second connector.

In some embodiments of this aspect, according to any one of the above example embodiments, the first cryptography processor and the second cryptography processor of the disclosed cable can both be configured to store a common key and utilize symmetric key cryptography to encrypt the transmission data and decrypt the reception data.

Another aspect of the present disclosure relates to a method for securing communications over a cable that can include a first connector and a second connector. In some embodiments, the method can include powering the first connector, powering the second connector, encrypting, by the first connector, transmission data transmitted through the first connector over the cable to the second connector, and decrypting, by the first connector, reception data received by the first connector over the cable from the second connector. In some embodiments, the method can include encrypting, by the second connector, transmission data transmitted through the second connector over the cable to the first connector, and decrypting, by the second connector, reception data received by the second connector over the cable from the first connector.

In some embodiments of this aspect, the disclosed method can include controlling the encrypting of the transmission data through the first connector based on a charge level of a first energy storage device for powering the first connector, and controlling the encrypting of the transmission data through the second connector based on a charge level of a second energy storage device for powering the second connector.

In some embodiments of this aspect, and according to any of one of above example embodiments, the disclosed method can include harvesting power from data signals transmitted through the first connector to power the first connector, and harvesting power from data signals transmitted through the second connector to power the second connector.

In some embodiments of this aspect, and according to any of one of above example embodiments, the disclosed method can include storing, by the first connector and the second connector, a common key, and utilizing, by the first connector and the second connector, symmetric key cryptography to encrypt the transmission data and decrypt the reception data.

Another aspect of the present disclosure relates to a connector for securing communications. In some embodiments, the connector can include cable connections that can be configured to be electrically coupled to conductors of a cable, an energy storage device, and a cryptography processor. In some embodiments, the energy storage device can be configured to power the cryptography processor for encrypting transmission data transmitted through the connector over the cable, and for decrypting reception data received by the connector over the cable.

In some embodiments of this aspect, the disclosed connector can be an RJ45 connector for facilitating ethernet communications over the cable between a first computer-based device connected to the connector and a second computer-based device.

In some embodiments of this aspect, and according to any of one of above example embodiments, the disclosed connector can include a power management processor that can be configured to control at least one of the cryptography processor or transmission of the transmission data based on a charge level of the energy storage device.

In some embodiments of this aspect, and according to any of one of above example embodiments, the energy storage device and the cryptography processor of the disclosed connector can be mounted to a printed circuit board (PCB) inside of the connector.

Another aspect of the present disclosure relates to a cable for securing communications. In some embodiments, the cable can include a plurality of conductors spanning a length of the cable from a first end of the cable to a second end of the cable, a first connector electrically coupled to the conductors at the first end of the cable, the first connector including a first energy storage device and a first cryptography processor, and a second connector electrically coupled to the conductors at the second end of the cable. In some embodiments, the first energy storage device can be configured to power the first cryptography processor for encrypting transmission data transmitted through the first connector over the cable to the second connector, and for decrypting reception data received by the first connector over the cable from the second connector.

In some embodiments of this aspect, the first connector and second connector of the disclosed cable can be RJ45 connectors for facilitating ethernet communications over the cable between a first computer-based device connected to the first connector and a second computer-based device connected to the second connector.

In some embodiments of this aspect, and according to any of one of above example embodiments, the disclosed cable can include a first power management processor that can be configured to control at least one of the first cryptography processor or transmission of the transmission data based on a charge level of the first energy storage device.

In some embodiments of this aspect, and according to any of one of above example embodiments, the first energy storage device and the first cryptography processor of the disclosed cable can be mounted to a printed circuit board (PCB) inside of the connector.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

FIG. 10 shows a flowchart of power management of the secure Ethernet cable, according to an example embodiment of the present disclosure.

DETAILED DESCRIPTION

Figure 1:
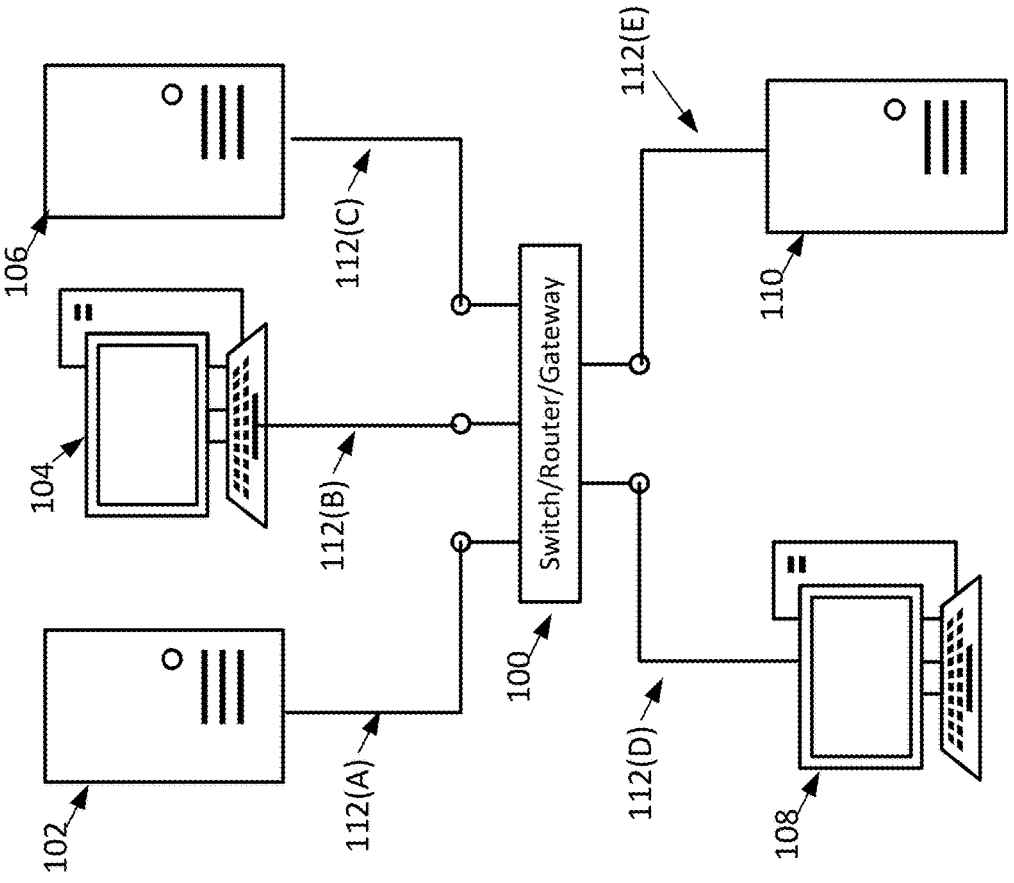
FIG. 1 shows an Ethernet network, according to an example embodiment of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In all the examples illustrated and discussed herein, any specific values should be interpreted to be illustrative and non-limiting. Thus, other example embodiments could have different values. Notice that similar reference numerals and letters refer to similar items in the following figures, and thus once an item is defined in one figure, it is possible that it need not be further discussed for the following figures. Below, the example embodiments will be described with reference to the accompanying figures.

The disclosed methods, devices and systems herein describe a secure connector/cable that increases cable security by seamlessly encrypting/decrypting the exchanged data between computer-based devices. Ethernet (e.g. RJ45) connectors are described herein for the sake of convenience, but it is noted that any type of cable connector can be modified/integrated with the hardware/functionality disclosed herein to facilitate secure communication. The encryption/decryption process executes on devices of a printed circuit board (PCB) included, for example, within the RJ45 connector. In one example, the solution is embedded in the Ethernet cable connector and powered by Ethernet-Harvested Energy that harvests energy from the transmitted binary signal to provide constant power for powering the encryption/decryption process. In another example, power is taken from an external power source such as a universal serial bus (USB) cable that plugs into the Ethernet cable connector. A benefit of the disclosed solution is that the end-user is not burdened and is not required to perform any additional configuration steps. The user simply plugs the cable into the two computer-based devices and the two chips embedded at the cable's ends perform encryption and decryption using a symmetric (e.g. common) cryptography key. In other words, the keys are pre-programmed into the chips during manufacturing. In a further example, the cable also performs authenticated encryption (AE) of the data using an encryption key and media access control (MAC) identifiers of the computer-based devices to ensure the security and authenticity of the transmitted data. For example, the transmitting connector may perform authenticated encryption (AE) where the symmetric key is used to encrypt both the ethernet data packet and the MAC of the transmitting computer-based device. The receiving connector of the Ethernet cable will decrypt the ethernet data packet and the MAC using the symmetric key and compare the decrypted MAC to a known MAC of an authorized transmission device (e.g. confirm the identity of the transmitting computer-based device based on a match between the stored and received MAC). The MAC of authorized transmission devices may be programmed into the memory (e.g. non-volatile memory) of the Ethernet cable connector when the Ethernet cable connector is initially plugged into the computer-based devices.

It should be noted that alternatively, the end-user can use a software application to program the Ethernet cable connector with cryptographic keys, MACs and other information to facilitate encryption and authentication processes. For example, the user can plug the Ethernet cable connector into their PC and run a cable software programming application that is able to read/write information from/to the memory of the Ethernet cable connector. This gives the end-user control over programming the Ethernet cable connector with keys, MACs and performing firmware updates to the Ethernet cable connector. This procedure can be performed for both Ethernet cable connectors of the cable.

FIG. 1 shows an Ethernet network including various computer-based devices connected (i.e. coupled) via various Ethernet cables. These computer-based devices may include servers 102, 106 and 110, personal computers (PCs) 104 and 108, switch/router/gateway 100 and other types of computer-based devices not shown that are connected via various Ethernet cables 112(A)-112(E). Ethernet cables traditionally include twisted pair conductors spanning a length of the cable. The conductors are electrically connected to plug-and-play male Ethernet connectors such as registered jack 45 (RJ45) connectors. The computer-based devices include complementary RJ45 female Ethernet connectors (jacks) for receiving the male connectors. The RJ45 male/female connectors/jacks described herein may be standardized 8-position 8-contact (8P8C) telecommunication network interfaces for interconnecting computer-based devices via twisted pair conductors. Once plugged in, data is transmitted/received between the computer-based devices over one or more of the twisted pair conductors within the cable to facilitate Ethernet communications.

Figure 2:
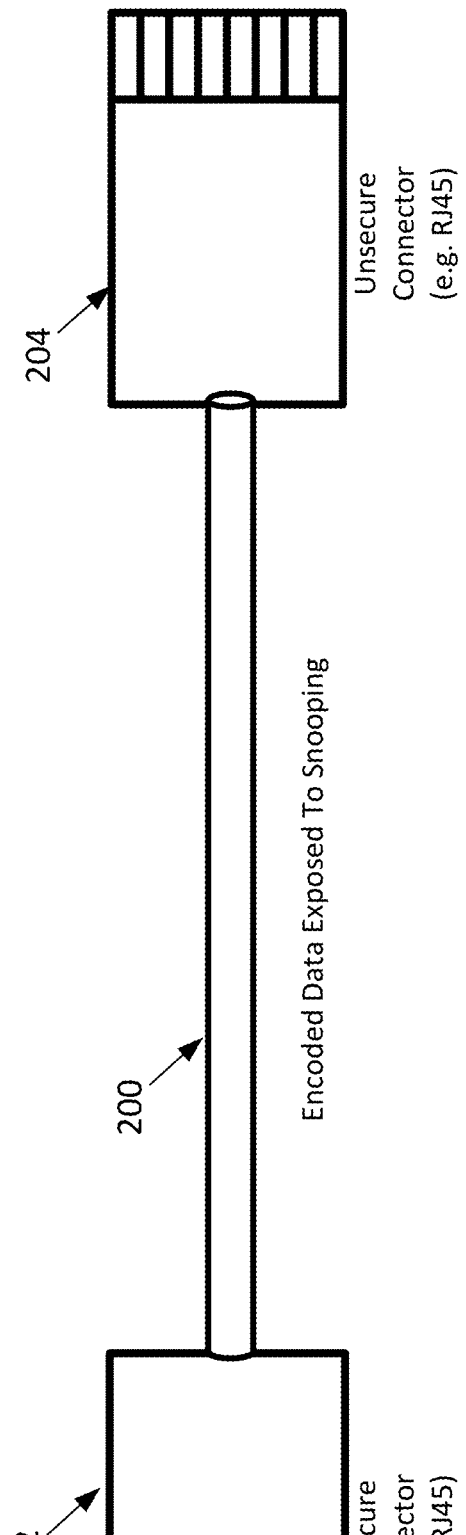
FIG. 2 shows an Ethernet cable, according to an example embodiment of the present disclosure.

FIG. 2 shows an example of one of the Ethernet cables shown in FIG. 1. In this example, the ethernet cable includes cable 200 (twisted pair conductors covered in a rubber jacket), connector 202 (e.g. male connector) electrically connected to the conductors on one end of cable 200, and connector 204 (e.g. male connector) electrically connected to the conductors on the other end of cable 200. A computer-based device (not shown) connected to connector 202 transmits an electrical signal representing transmission data (e.g. binary data) to its integrated RJ45 connector (e.g. female jack) not shown. This electrical signal is passed through connector 202, one or more conductors of cable 200, connector 204, and is received by the integrated RJ45 connector of another computer-based device (not shown) connected to connector 204. It is noted that connectors 202 and 204 in this example are pass-through connectors that simply pass the binary data between the computer-based devices and the Ethernet cable. Therefore, the binary data transmitted over cable 200 is not encrypted and may therefore be intercepted by a snooping device via a direct electrical connection to cable 200 or by a less invasive electromagnetic (EM) sensor. In either case, the unencrypted binary data is vulnerable as it traverses the length of cable 200.

Figure 3:
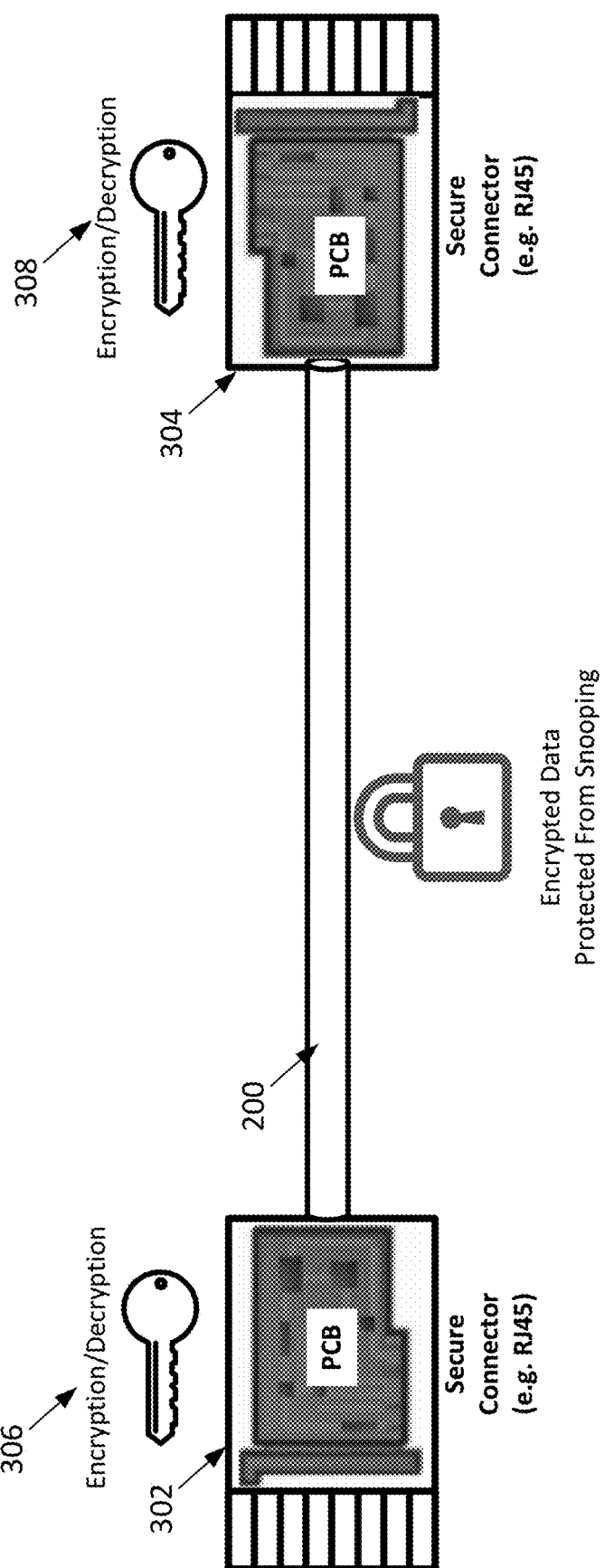
FIG. 3 shows a secure Ethernet cable, according to an example embodiment of the present disclosure.

To protect against eavesdropping (sniffing) attacks, the disclosure provides a secure Ethernet cable as shown in FIG. 3. The secure Ethernet cable replaces standard RJ45 connectors 202 and 204 with secure RJ45 connectors 302 and 304 having internal electronics mounted to a PCB. These internal electronics perform various functions including but not limited to power harvesting and encryption/decryption (e.g. symmetric key cryptography) of data transmitted over Ethernet cable 200 using encryption/decryption keys 306 and 308. The secure RJ45 connectors 302 and 304 are manufactured with internal electronics encapsulated in standard plastic/rubber materials used by RJ45 connectors. Furthermore, the size of the electronics and PCB are small enough that the size of the secure RJ45 connector is relatively the same size as the unsecure RJ45 connector in FIG. 2. It is noted that the secure RJ45 connectors 302 and 304 may be connected to cable 200 during manufacturing to produce a complete cable, or secure RJ45 connectors 302 and 304 may be sold separately where the end-user makes the electrical connections between the secure RJ45 connectors and cable 200.

Figure 4:
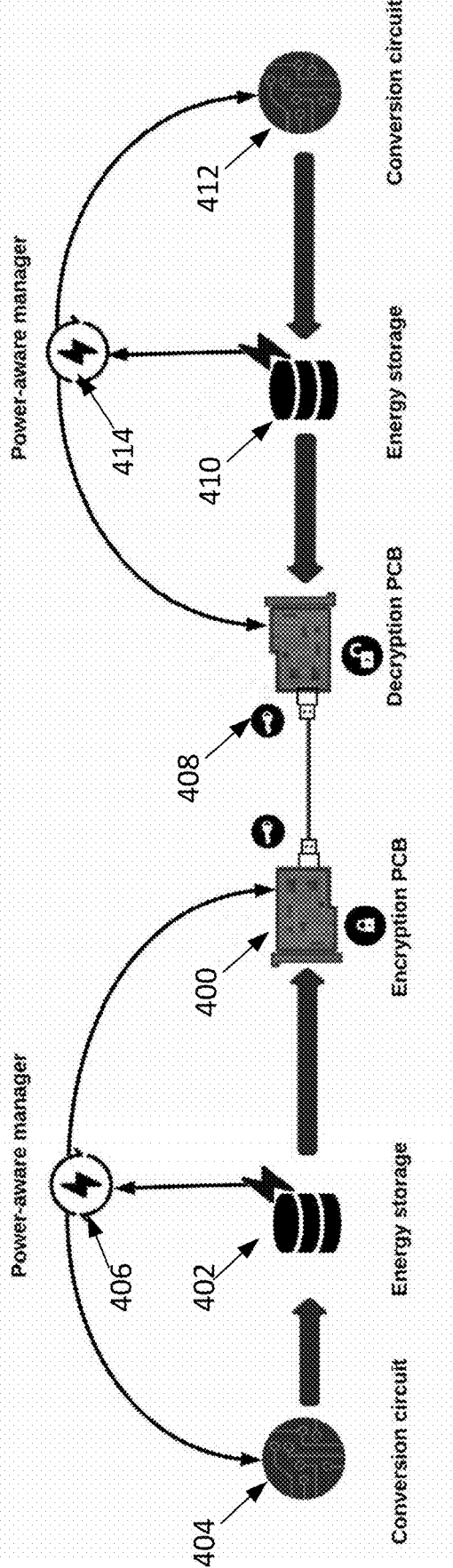
FIG. 4 shows details of the secure Ethernet cable, according to an example embodiment of the present disclosure.

FIG. 4 shows the details of the electronics in the secure RJ45 connectors in FIG. 3. Each of the secure RJ45 connectors includes a respective PCB 400/408 for mounting the supporting electronics for providing secure communications. Specifically, each of the secure RJ45 connectors include (mounted to their respective PCB) respective energy storage devices 402/410 (e.g. battery, capacitor, etc.) for powering the electronics of the secure Ethernet connector, conversion circuits 404/412 for harvesting power from the transmitted data to store in the storage devices, and power management devices 406/414 for managing the operation of the electronics in the secure Ethernet connector based on the available power. In the example shown in FIG. 4, PCB 400 is performing the encryption, whereas secure PCB 408 is performing the decryption. However, it is noted that the encryption/decryption devices in PCBs 400 and 408 perform both encryption and decryption depending on whether they are transmitting or receiving data. Furthermore, this encryption/decryption may occur sequentially or simultaneously in either half-duplex or full-duplex mode depending on the operation mode and capabilities of the connected computer-based devices (not shown).

In general, the secure RJ45 connectors shown in FIG. 4 operate as follows. In one example, a computer-based device (not shown) connected to PCB 400 transmits an electrical signal representing binary data. This binary data may be structured as an Ethernet packet. Conversion circuit 404 of PCB 400 receives the electrical signal and harvests energy from the electrical signal which is then stored in an energy storage device 402 of PCB 400. The power management device 406 (e.g. processor) of PCB 400 monitors the energy stored in energy storage device 402 and controls the operation of encryption PCB 400 accordingly. In other words, if the energy stored in energy storage device 402 is sufficient, then power management device 406 enables the encryption/decryption device of PCB 400 to encrypt the binary data. If, however, the energy stored in the energy storage device 402 is insufficient, then power management device 406 powers down the encryption/decryption device of PCB 400 at which point the unencrypted binary data may be transmitted (e.g. bypass the encryption/decryption device) or may not be transmitted at all (e.g. blocked transmission). In yet another example, rather than powering down the encryption/decryption device of PCB 400, power management device 406 controls encryption/decryption device of PCB 400 to utilize less power by executing less complex (e.g. less bits, fewer operations, etc.) encryption scheme. The goal of power management device 406 is to reduce the power consumption of the secure Ethernet connector so that the energy level of energy storage device 402 recovers to a sufficient level for supporting full encryption/decryption capabilities. It is noted that energy storage device 410, conversion circuit 412 and power management device 414 of PCB 408 operate in a manner similar to energy storage device 402, conversion circuit 404 and power management device 406 respectively.

Figure 5:
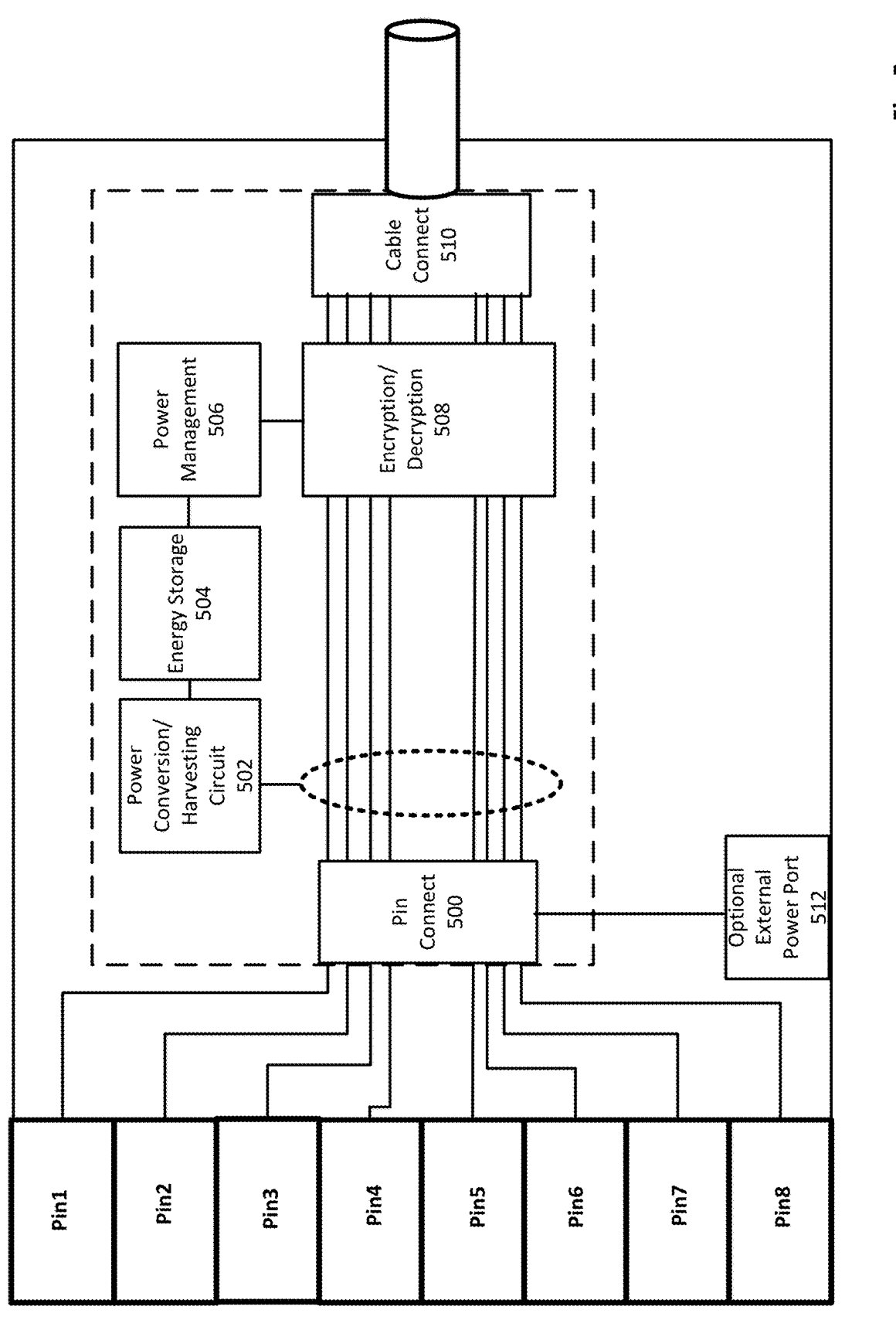
FIG. 5 shows details of the secure Ethernet cable connector, according to an example embodiment of the present disclosure.

The internal electronics of the secure RJ45 connectors shown in FIG. 4 are shown in more detail in FIG. 5. Specifically, FIG. 5 shows that the secure RJ45 connectors include electrical pins for plugging the RJ45 connector into the RJ45 jack of the computer-based device. These pins are electrically connected to a pin connect 500 (e.g. terminal) that routes the individual electrical conductors to the encryption/decryption device 508 (i.e. cryptography processor) and to other devices within the secure RJ45 connectors. It is shown that the secure RJ45 connectors generally include power conversion/harvesting circuit 502, energy storage device 504, the power management device 506 (e.g. processor) and cable connect 510 which electrically connects the wires of the secure RJ45 connectors to the Ethernet cable.

During an encryption operation, electrical signals are received from the transmitting computer-based device (not shown) via one or more of the pins and routed via the pin connect 500 to encryption/decryption device 508. When the electrical signals are received, they are also routed to power conversion/harvesting circuit 502 which converts the varying binary electrical signals to a constant power signal that is used to charge energy storage device (e.g. capacitor, battery, etc.) 504. Power management device 506 which may be a processor, monitors the energy level of energy storage device 504 and controls the distribution of the stored energy to other devices within the secure Ethernet connector. For example, the power management device 506 sends control/power signals to encryption/decryption device 508 based on the level of energy stored in energy storage device 504. Assuming there is enough energy stored in energy storage device 504, power management device 506 powers encryption/decryption device to perform encryption of the signals received from pin connect 500. These encrypted signals are then transmitted over the cable via cable connect 510. If there is an insufficient amount of energy stored in energy storage device 504, power management device 506 may force the electrical signals to bypass encryption/decryption device 508 and transmit unencrypted signals over cable via cable connect 510, or block transmission of data altogether. When there is an insufficient amount of energy stored in energy storage device 504, power management device 506 may power down encryption/decryption device 508 or reduce the computational complexity of the encryption/decryption algorithm to reduce power consumption and allow time for energy storage device 504 to charge to a sufficient charge level.

During decryption operation, electrical signals are received from the cable conductors on cable connect 510 and routed to encryption/decryption device 508. Assuming there is enough energy stored in energy storage device 504, power management device 506 powers encryption/decryption device to perform decryption of the signals received from pin connect 500. These decrypted signals are then transmitted to pin connect 500 and to pins 1-8. If there is an insufficient amount of energy stored in energy storage device 504, power management device 506 may force the electrical signals to bypass encryption/decryption device 508 and send the still encrypted signals to pin connect 500 and to pins 1-8. Power conversion/harvesting circuit 502 may also harvest power from these received electrical signals to further charge energy storage device (e.g. capacitor) 504. Particularly, power harvesting may be performed based on the electrical signals of both transmitted and received data.

It is noted that both encryption and decryption may be performed sequentially over the same conductors in half-duplex operation or simultaneously over multiple conductors in full-duplex mode depending on the operational modes and capabilities of the connected computer-based devices. In the full-duplex operation, one pair of conductors may be used for transmission in one direction, while another pair of conductors may be used for simultaneous transmission in the opposite direction. In the half-duplex mode, one pair of conductors may be used for sequential transmission in both directions.

In either configuration, the power conversion/harvesting circuit 502 may harvest power from the varying data signals or from a constant voltage signal provided over the conductors. For example, unused conductors (e.g. conductors not being used for data transmission) may be used to transmit a constant voltage which may be used to charge energy storage device 504 (e.g. power conversion/harvesting circuit 502 may send the constant voltage to energy storage device 504). In yet another configuration, power conversion/harvesting circuit 502 may not be needed/used if an external power source is provided. For example, power conversion/ harvesting circuit 502 could be replaced or supplemented with an optional external power port 512 (e.g. a universal serial bus (USB) port) for providing external USB-connected power to the pin connect 500 or directly to energy storage device 504. The user would simply plug a USB connector (e.g. micro-USB connector) into a female USB connector (e.g. micro-USB connector) integrated directly into the secure Ethernet connector. This external power would then be used to charge energy storage device 504 for supplying energy to the various electronic devices on the PCB.

Figure 6A:
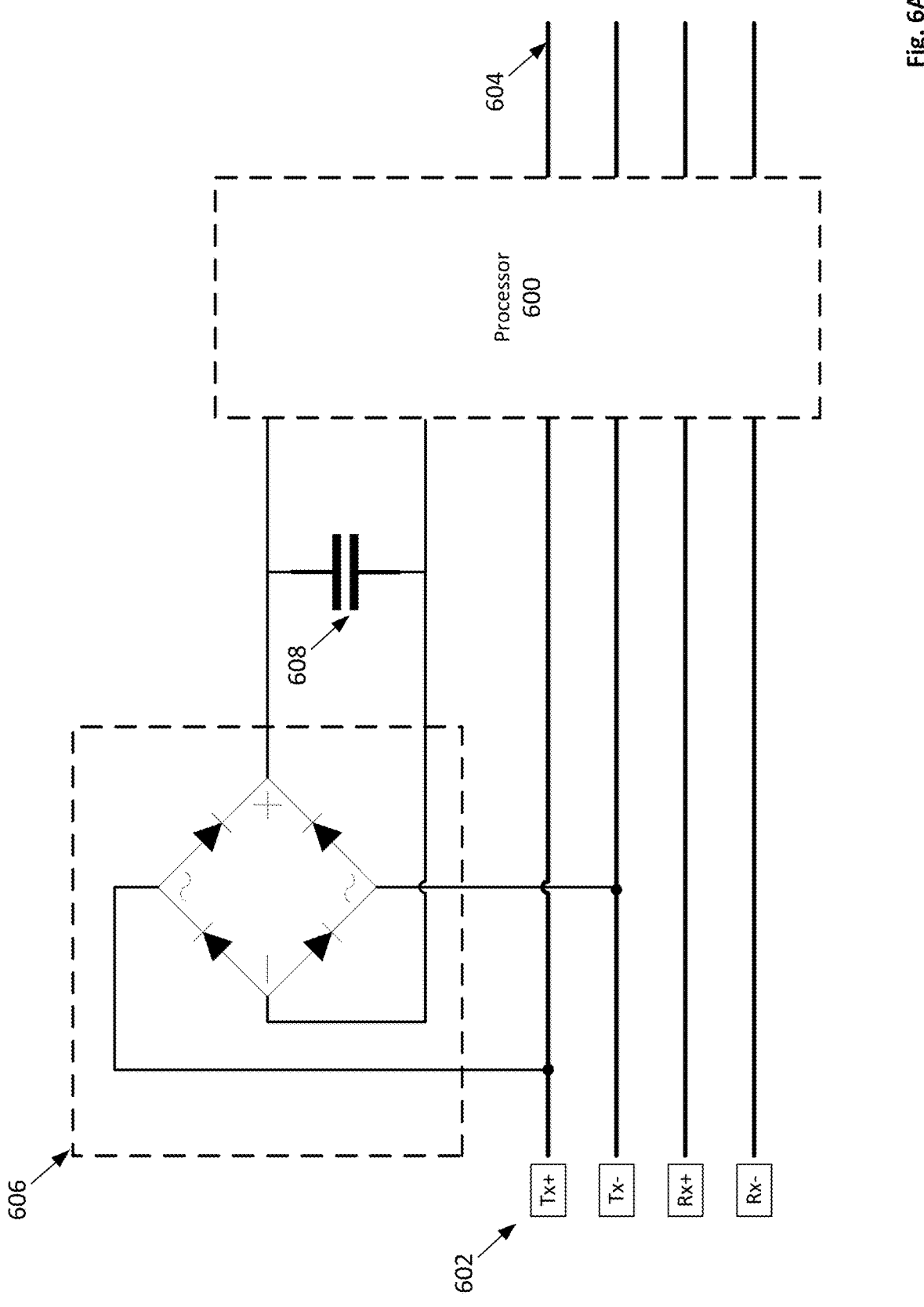
FIG. 6A shows details of the power harvester and processor of the secure Ethernet cable, according to an example embodiment of the present disclosure.

Power conversion/harvesting circuit 502 may be implemented in various example embodiments. For example, as shown in FIG. 6A, power conversion/harvesting circuit 502 may be embodied as a rectifier circuit 606 (e.g. full bridge rectifier) that is directly connected to two or more of the internal conductors 602 within the secure RJ45 connector. These connections may be two complementary transmission lines that transmit differential voltage signals to represent binary data. These positive and negative alternating complementary signals are rectified to produce a rectified signal for charging the energy storage device embodied as capacitor 608 which provides power to processor 600. It is noted that processor 600 depicted in FIG. 6A may represent a common device that acts as both power management device 506 and encryption/decryption device 508 connected to cable connect 510 (not shown) via lines 604. However, in another example embodiment, power management device 506 may be a processor within 600, while encryption/decryption device 508 may be a separate circuit within 600. In other words, power management device 506 and encryption/decryption device 508 may be the same device or separate devices such as a processor, circuitry or the like.

Figure 6B:
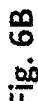
FIG. 6B shows details of the power harvester and processor of the secure Ethernet cable, according to an example embodiment of the present disclosure.

As shown in FIG. 6B, power conversion/harvesting circuit 502 (from FIG. 5) may be embodied as an off-the-shelf power harvester integrated circuit (IC) 610 such as the MAX17710 IC that is directly connected to two or more of the internal conductors 602 within the secure RJ45 connector. As described above, these connections may be complementary transmission lines that transmit differential voltage signals. Like FIG. 6A, the positive and negative alternating complementary signals are converted to a constant signal by the power harvester IC and stored in the energy storage device embodied as capacitor 608 which provides power to processor 600.

It is noted that if external power is available, the power harvesting circuits shown in FIGS. 6A and 6B may be replaced with a power circuit/port such as a USB power circuit/port for providing continuous power to capacitor 608. Alternatively, the power harvesting circuits may be maintained in the connector, and the USB power can simply be applied to conductors 602 via the USB port/circuit, at which point the power harvesting circuits will transfer the USB power to capacitor 608.

The operation of the secure Ethernet connectors/cables described above will now be described in more detail with respect to the flowcharts of FIGS. 7-11.

Figure 7:
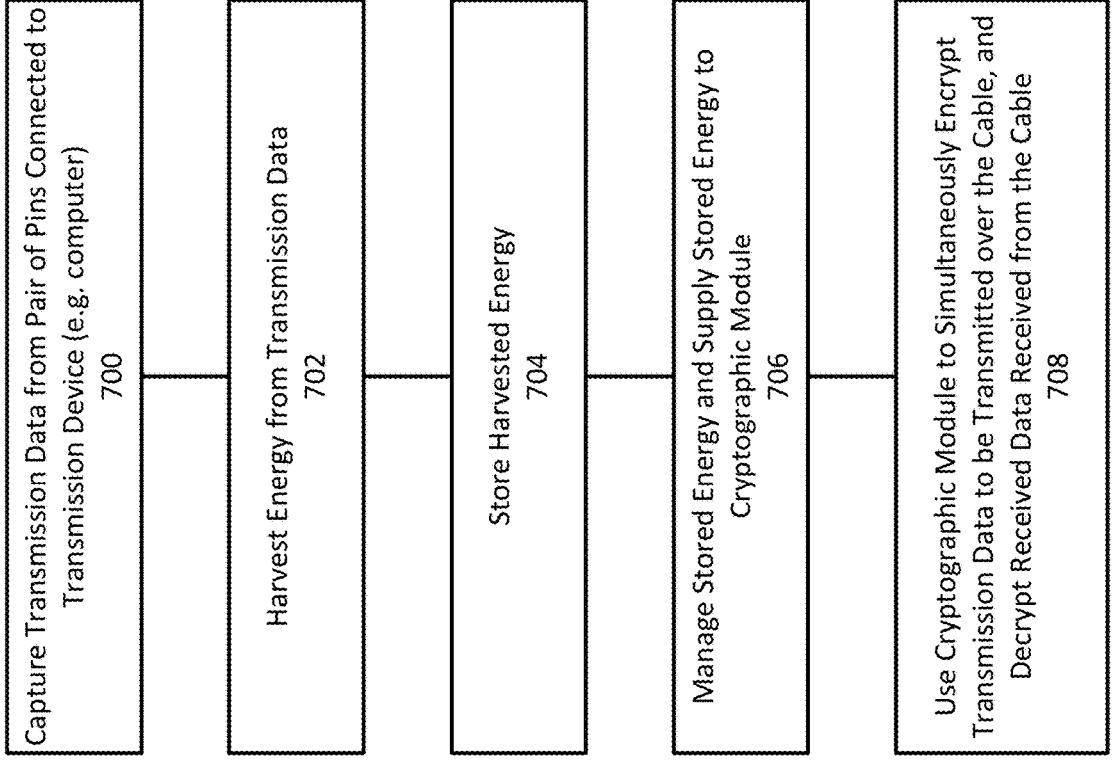
FIG. 7 shows a flowchart of the full-duplex operation of the secure Ethernet cable, according to an example embodiment of the present disclosure.

FIG. 7 shows a flowchart of full-duplex operation (simultaneous transmission/reception) over the secure Ethernet cable. In step 700, the power conversion/harvesting circuit 502 captures electrical signals (e.g. differential signals) representing transmission data from the conductors connected to pin connect 500. This can be accomplished by direct electrical connections between the conductors and input terminals of conversion/harvesting circuit 502. In step 702, power conversion/harvesting circuit 502 (e.g. full bridge rectifier, harvesting IC, or the like) harvests energy from these data signals and stores the harvested energy in step 704. In step 706, the power management device 506 determines if sufficient energy is stored in energy storage device 504 and then provides power to encryption/decryption device 508 which simultaneously encrypts transmitted data (data transmitted from the connected computer-based device over the cable) and decrypts reception data (data received over the cable from another computer-based device) in step 708.

Figure 8:
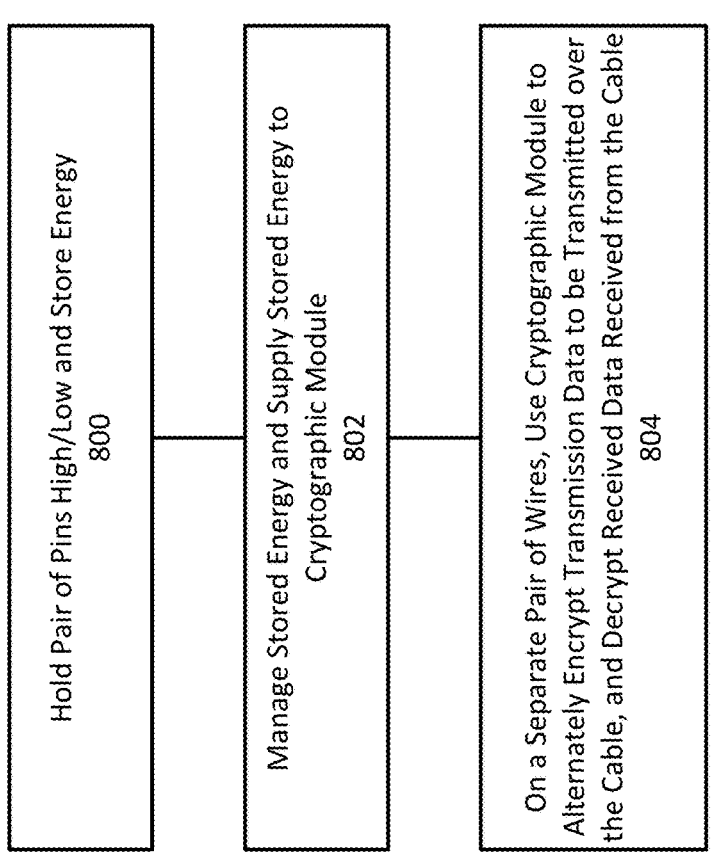
FIG. 8 shows a flowchart of the half-duplex operation of the secure Ethernet cable, according to an example embodiment of the present disclosure.

In another example embodiment, the half-duplex operation may be performed instead of the full-duplex operation. FIG. 8 shows a flowchart of half-duplex operation over the secure Ethernet cable. In step 800, an unused pair of conductors are held at constant (i.e. continuously) high and low (i.e. high/low) voltage signals by the transmitting computer-based device. The power conversion/harvesting circuit 502 harvests energy from these constant high/low voltage signals and stores the harvested energy in the energy storage device. In step 802, the power management device 506 determines if sufficient energy is stored and then provides the power to encryption/decryption device 508 which alternately and sequentially encrypts transmitted data and decrypts received data over the common conductors in step 804.

Although FIGS. 7 and 8 are described with specific power harvesting examples, it is noted that in FIGS. 7 and 8, power harvesting can be performed based on the electrical signals representing the data, based on high/low voltage signals held constant by the computer-based devices, or based on external power injected into the secure Ethernet connector. In addition, it is noted that the signals for harvesting power could be the signals transmitted from the secure Ethernet connector or signals received by the secure Ethernet connector. In essence, the power can be harvested from either of the secure Ethernet connectors on the cable and from multiple sources (transmission/reception signals, constant signals, external power, etc.).

Figure 9:
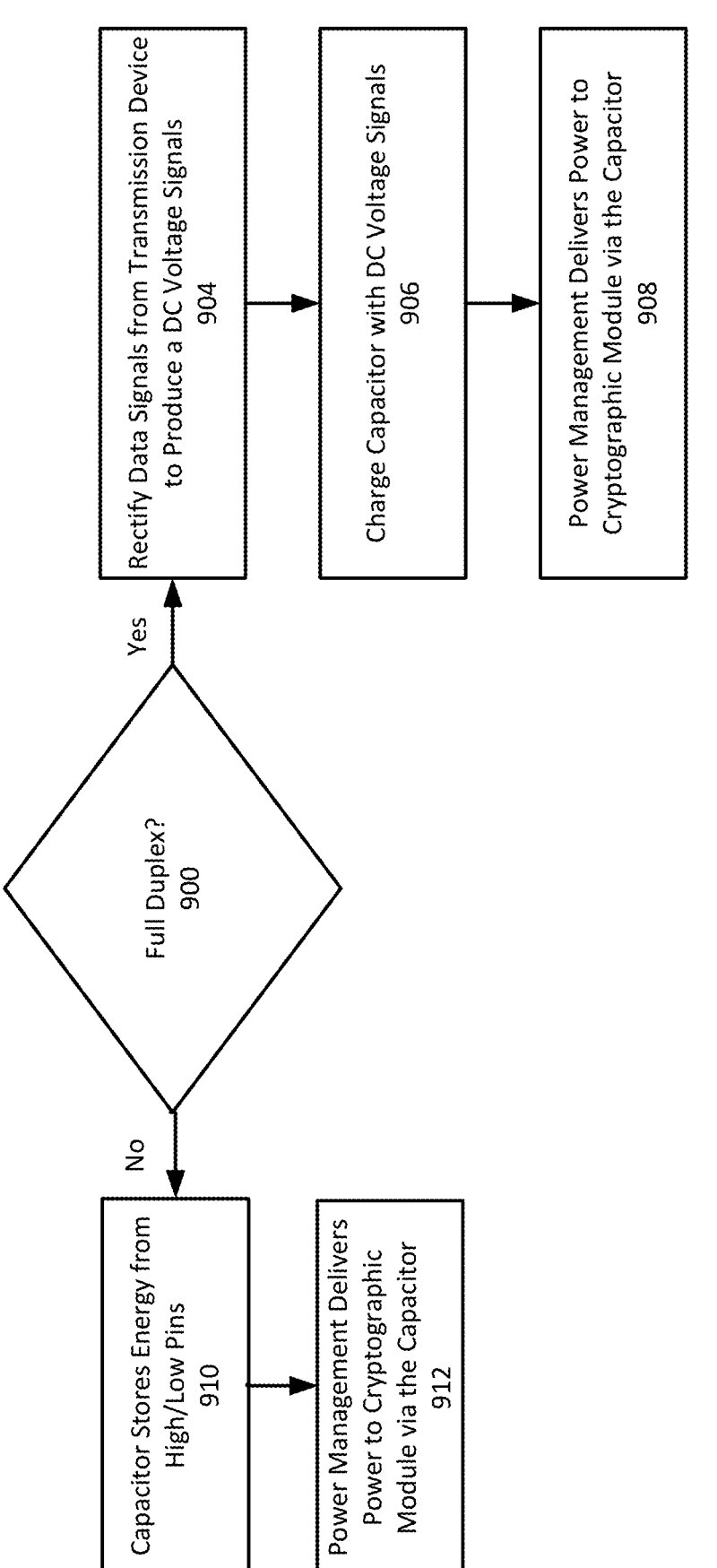
FIG. 9 shows a flowchart of the conversion/harvesting of the secure Ethernet cable, according to an example embodiment of the present disclosure.

FIG. 9 shows a flowchart of details of the conversion/ harvesting of power. In step 900, the power management device 506 determines if the computer-based devices are operating in full-duplex mode or half-duplex mode. This may be determined by monitoring the signals on the conductors. If full-duplex mode is detected (e.g. simultaneous transmission/reception signals are detected), power conversion/harvesting circuit 502 rectifies the data signals in step 904 to produce constant voltage signals for charging the energy storage device 504 in step 906. The power management device 506 then delivers the stored power to encryption/decryption device 508 in step 908 which powers the encryption/decryption device 508 to perform simultaneous encryption/decryption operations for transmitted/received data. If, however, the half-duplex mode is detected (e.g. sequential transmission or reception signals are detected along with constant high/low voltage signals), the power conversion/harvesting circuit 502 simply passes the constant high/low voltage signals to the energy storage device 504 in step 910. The power management device 506 then delivers the stored power to encryption/decryption device 508 in step 912 which powers the encryption/decryption device 508 to perform sequential encryption/decryption operations for transmitted/received data. It is noted that in some example embodiments, full-duplex mode or half-duplex mode may not need to be actively detected by power management device 506 because the data signals and/or high/low voltage signals may be harvested to charge the energy storage device 504, and the data may be encrypted/decrypted regardless of the operational mode.

FIG. 10 shows a flowchart of details of power management. In step 1000, the power management device 506 determines if sufficient energy is stored for supporting cryptography operations. This may be determined by measuring the voltage across energy storage device 504, or other equivalent energy tests. If power management device 506 determines that enough energy is stored, then power management device 506 delivers the stored energy from energy storage device 504 to encryption/decryption device 508 in step 1002. If, however, the power management device 506 determines an insufficient amount of energy is stored, then power management device 506 takes proactive actions in step 1004 to aid in the charging of energy storage device 504. For example, the power management device 506 may enter a sleep mode via dynamic power management (DPM), stretch execution of tasks by lowering operational clock frequency via dynamic voltage and frequency scaling (DVFS), force the encryption/decryption device 508 to use smaller less complicated cyphers that consume less power, and the like. Effectively, the power management device 506 takes steps to reduce (e.g. minimize) power consumption of the secure RJ45 connector to provide enough time for the encryption/decryption device 508 to charge to an adequate level before returning to normal operation. During these proactive power-saving actions, the secure Ethernet connector will still be operational, but at the expense of lower performance (e.g. slower processor, less secure ciphers, etc.).

Figure 11:
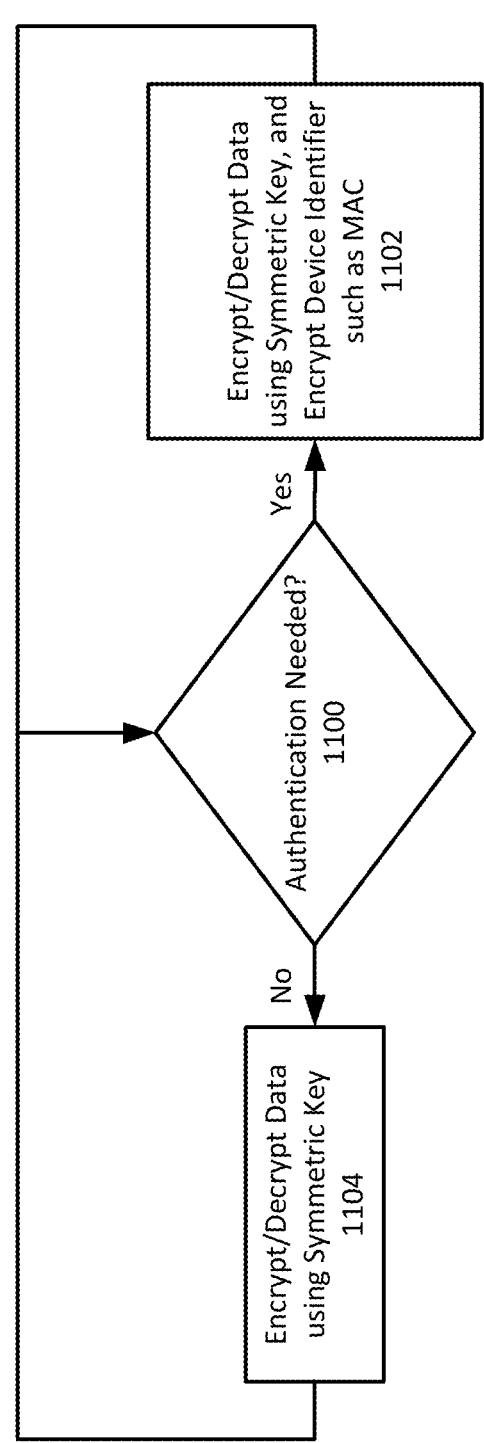
FIG. 11 shows a flowchart of encryption/decryption of the secure Ethernet cable, according to an example embodiment of the present disclosure.

FIG. 11 shows a flowchart of details of encryption/decryption. In an example embodiment, the encryption/decryption device 508, in step 1100, determines if authentication of the message is needed or desired. If authentication is not needed, encryption/decryption device 508 performs encryption/decryption of the data using a symmetric key in step 1104. Encryption can be performed using different techniques such as stream ciphers, substitution ciphers, block ciphers and the like. If, however, it is determined that authentication is needed or desired, encryption/decryption device 508 performs encryption/decryption of the data using a symmetric key and includes an encrypted version of the transmission device identifier in step 1102 using authentication encryption (AE) techniques. The transmission device identifier may be, for example, the MAC of the computer-based devices and used in various AE techniques such as encrypt-then-MAC, Encrypt-and-MAC, MAC-then-Encrypt and the like. The MAC of the transmission device is used by the secure Ethernet connector at the transmitting computer-based device to sign the transmitted data, which can then be verified by the secure Ethernet connector at the receiving computer-based device. The MAC addresses of the transmission/reception computer-based devices may be automatically programmed into the secure Ethernet connectors upon initial connection of the cable to the computer-based devices, or by a software application executed by the user.

The connectors of the secure Ethernet cable may be programmed with relevant data for facilitating secure communication. This programming may be performed pre-manufacturing, during manufacturing, or post-manufacturing. For example, the secure ethernet connectors may be pre-programmed during manufacturing to store cryptographic keys, MACs and other information to facilitate encryption and authentication processes. This ensures that the connectors are already paired out of the box. In another example, the secure ethernet connectors could be programmed by the user. For example, the end-user can use a software application (running on their computer-based device) to program the Ethernet cable connectors with the cryptographic keys, MACs and other information to facilitate encryption and authentication processes. For example, the user can plug the Ethernet cable connector into their PC and run a cable software programming application that reads/writes information from/to the memory of the Ethernet cable connector. This gives the end-user control over programming the Ethernet cable connector with keys, MACs and performing firmware updates. This procedure can be performed for both Ethernet cable connectors of the cable.

It is also noted that the solution described in this disclosure can be provided to the user in different ways. In one example, the Ethernet cable having the secure Ethernet connectors already installed thereon can be provided to the user. This allows the user to connect their computer-based devices directly with the secure Ethernet cable. In another example, the secure Ethernet connectors can be provided to the user separately from the Ethernet cable. This allows the user to make their own secure Ethernet cable by electrically connecting the secure Ethernet connectors to an Ethernet cable. This may beneficial where a user already has an Ethernet cable that they do not want to completely replace, but rather upgrade. In yet another example, the secure Ethernet cable may include a small length of Ethernet cable with one secure Ethernet connector (e.g. male connector) and one standard Ethernet connector (e.g. female). This would allow the user to convert an existing standard Ethernet cable to a secure Ethernet cable. Essentially, the user would install a small secure Ethernet cable on either end of a larger standard Ethernet cable (e.g. plug the ends of the larger standard Ethernet cable into respective female connectors of the small secure Ethernet cables and plug the male connectors of the small secure Ethernet cables into the computer-based devices). In either of these examples, the secure Ethernet connectors can be pre-programmed/paired during manufacturing and/or programmed/paired by the end-user.

It is also noted that although the examples described throughout show the secure Ethernet cables using male connectors, they could alternatively use female connectors. In other words, the secure Ethernet connectors could be male or female depending on the application.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A cable for securing communications, the cable comprising:

a plurality of conductors spanning a length of the cable from a first end of the cable to a second end of the cable;

a first cable connector plug electrically coupled to the conductors at the first end of the cable, the first cable connector plug comprising a first energy storage device and a first cryptography processor programmed with a key; and a second cable connector plug electrically coupled to the conductors at the second end of the cable, the second cable connector plug comprising a second energy storage device and a second cryptography processor programmed with the key, wherein:

the first energy storage device is configured to power the first cryptography processor to receive unencrypted data from a first computer that the first cable connector plug is plugged into, encrypt the unencrypted data using the key to produce transmission data, transmit the transmission data through the first cable connector plug over the cable to the second cable connector plug, and to decrypt reception data received by the first cable connector plug over the cable from the second cable connector plug and encrypted by the second cable connector plug with the key, and transmit the decrypted reception data to the first computer, and the second energy storage device is configured to power the second cryptography processor to receive unencrypted data from a second computer that the second cable connector plug is plugged into, encrypt the unencrypted data using the key to produce transmission data, transmit the transmission data through the second cable connector plug over the cable to the first cable connector plug, and to decrypt reception data received by the second cable connector plug over the cable from the first cable connector plug and encrypted by the first cable connector plug with the key, and transmit the decrypted reception data to the second computer.

2. The cable of claim 1, wherein the first cable connector plug and the second cable connector plug are RJ45 connectors for facilitating ethernet communications over the cable between a first computer-based device connected to the first cable connector plug and a second computer-based device connected to the second cable connector plug.

3. The cable of claim 1, wherein the first energy storage device is a first capacitor, and the second energy storage device is a second capacitor.

4. The cable of claim 1, further comprising:

a first power harvesting circuit configured to:

harvest power from data signals transmitted through the first cable connector plug, by rectifying the data signals to produce a rectified signal, and using the rectified signal to charge the first energy storage device, or harvest power from continuously high and low voltage signals transmitted through the first cable connector plug, by using the continuously high and low voltage signals to charge the first energy storage device; and a second power harvesting circuit configured to:

harvest power from data signals transmitted through the second cable connector plug, by rectifying the data signals to produce a rectified signal, and using the rectified signal to charge the second energy storage device, or harvest power from continuously high and low voltage signals transmitted through the second cable connector plug, by using the continuously high and low voltage signals to charge the second energy storage device.

5. The cable of claim 1, further comprising:

a first universal serial bus (USB) connector coupled to the first cable connector plug, the first USB connector is configured to provide power for charging the first energy storage device; and a second USB connector coupled to the second cable connector plug, the second USB connector is configured to provide power for charging the second energy storage device.

6. The cable of claim 1, further comprising:

a first power management processor configured to control at least one of the first cryptography processor or transmission of the transmission data based on a charge level of the first energy storage device; and a second power management processor configured to control at least one of the second cryptography processor or transmission of the transmission data based on a charge level of the second energy storage device.

7. The cable of claim 1, wherein the first energy storage device and the first cryptography processor are mounted to a first printed circuit board (PCB) inside of the first cable connector plug, and wherein the second energy storage device and the second cryptography processor are mounted to a second PCB inside of the second cable connector plug.

8. The cable of claim 1, wherein the first cryptography processor and the second cryptography processor are both configured to store a common key and utilize symmetric key cryptography to encrypt the transmission data and decrypt the reception data.

9. A method for securing communications over a cable comprising a first cable connector plug and a second cable connector plug, the method comprising:

powering the first cable connector plug programmed with a key;

powering the second cable connector plug programmed with the key;

receiving, by the first cable connector plug, unencrypted data from a first computer that the first cable connector plug is plugged into;

encrypting, by the first cable connector plug using the key, the unencrypted data to produce transmission data for transmission through the first cable connector plug over the cable to the second cable connector plug;

decrypting, by the first cable connector plug using the key, reception data received by the first cable connector plug over the cable from the second cable connector plug and encrypted by the second cable connector plug with the key;

transmitting, by the first cable connector plug, the decrypted reception data to the first computer;

receiving, by the second cable connector plug, unencrypted data from a second computer that the second cable connector plug is plugged into;

encrypting, by the second cable connector plug using the key, the unencrypted data to produce transmission data for transmission through the second cable connector plug over the cable to the first cable connector plug;

decrypting, by the second cable connector plug using the key, reception data received by the second cable connector plug over the cable from the first cable connector plug and encrypted by the first cable connector plug with the key; and transmitting, by the second cable connector plug, the decrypted reception data to the second computer.

10. The method of claim 9, further comprising:

controlling the encrypting of the transmission data through the first cable connector plug based on a charge level of a first energy storage device for powering the first cable connector plug; and controlling the encrypting of the transmission data through the second cable connector plug based on a charge level of a second energy storage device for powering the second cable connector plug.

11. The method of claim 9, further comprising:

harvesting power from data signals transmitted through the first cable connector plug to power the first cable connector plug; and harvesting power from data signals transmitted through the second cable connector plug to power the second cable connector plug.

12. The method of claim 9, further comprising:

storing, by the first cable connector plug and the second cable connector plug, a common key; and utilizing, by the first cable connector plug and the second cable connector plug, symmetric key cryptography to encrypt the transmission data and decrypt the reception data.

* * * * *